(12) United States Patent
Paripovic et al.

(10) Patent No.: US 12,522,706 B2
(45) Date of Patent: Jan. 13, 2026

(54) THERMALLY EXPANDABLE COMPOSITIONS COMPRISING AN ENDOTHERMIC BLOWING AGENT

(71) Applicant: SIKA TECHNOLOGY AG, Baar (CH)

(72) Inventors: Dusko Paripovic, Zürich (CH); Loic Zingraff, Zürich (CH); Nicolae Bordeanu, Winterthur (CH)

(73) Assignee: SIKA TECHNOLOGY AG, Baar (CH)

( * ) Notice: Subject to any disclaimer, the term of this patent is extended or adjusted under 35 U.S.C. 154(b) by 893 days.

(21) Appl. No.: 17/623,821

(22) PCT Filed: Aug. 17, 2020

(86) PCT No.: PCT/EP2020/073030
§ 371 (c)(1),
(2) Date: Dec. 29, 2021

(87) PCT Pub. No.: WO2021/028601
PCT Pub. Date: Feb. 18, 2021

(65) Prior Publication Data
US 2022/0372239 A1  Nov. 24, 2022

(30) Foreign Application Priority Data
Aug. 15, 2019 (EP) .................................... 19191990

(51) Int. Cl.
*C08J 9/00* (2006.01)
*C08J 9/08* (2006.01)
*C08L 23/0869* (2025.01)

(52) U.S. Cl.
CPC ............ *C08J 9/0061* (2013.01); *C08J 9/0066* (2013.01); *C08J 9/08* (2013.01); *C08L 23/0869* (2013.01); *C08J 2201/03* (2013.01); *C08J 2203/02* (2013.01); *C08J 2323/08* (2013.01); *C08J 2363/00* (2013.01); *C08J 2423/08* (2013.01); *C08L 2203/14* (2013.01); *C08L 2205/025* (2013.01); *C08L 2205/035* (2013.01)

(58) Field of Classification Search
CPC . C08J 9/0061; C08J 9/0066; C08J 9/08; C08J 2201/03; C08J 2203/02; C08J 2323/08; C08J 2363/00; C08J 2423/08; C08J 9/0028; C08L 23/0869; C08L 2203/14; C08L 2205/025; C08L 2205/035
See application file for complete search history.

(56) References Cited

U.S. PATENT DOCUMENTS

| 2018/0215887 A1 | 8/2018 | Kohlstrung et al. |
| 2018/0215888 A1* | 8/2018 | Kohlstrung ......... C08L 23/0884 |
| 2018/0298156 A1 | 10/2018 | Poeller et al. |

FOREIGN PATENT DOCUMENTS

| CN | 110300777 A | 10/2019 | |
| DE | 10 2011 080 223 A1 | 2/2013 | |
| WO | WO-2008034755 A1 * | 3/2008 | ............ C08J 9/0061 |
| WO | WO-2018149826 A1 * | 8/2018 | ................ C08J 9/08 |

OTHER PUBLICATIONS

Oct. 8, 2020, International Search Report issued in International Patent Application No. PCT/EP2020/073030.
Oct. 8, 2020, Written Opinion of the International Searching Authority in International Patent Application No. PCT/EP2020/073030.

\* cited by examiner

*Primary Examiner* — K. Boyle
(74) *Attorney, Agent, or Firm* — Oliff PLC

(57) ABSTRACT

A thermally expandable composition includes at least one epoxy-functional polymer, at least one endothermic chemical blowing agent, and at least one curative selected from the group made of a urea, urea derivatives, guanidine derivatives, amidine derivatives, and imidazoles. Further, a baffle and/or a reinforcement element for hollow structures includes the thermally expandable composition, a process manufactures the baffle and/or the reinforcement element, the baffle and/or the reinforcement element is used for sealing, baffling, or reinforcing of a cavity or a hollow structure, and a method seals, baffles and/or reinforces a cavity or hollow structure.

18 Claims, No Drawings

THERMALLY EXPANDABLE COMPOSITIONS COMPRISING AN ENDOTHERMIC BLOWING AGENT

TECHNICAL FIELD

The present invention relates to thermally expandable compositions and use thereof for providing baffle and/or reinforcement elements. Such elements are particularly suitable for use in sealing, baffling, and/or reinforcing of hollow structures, for example cavities in a hollow structural part of an automotive vehicle.

BACKGROUND OF THE INVENTION

Manufactured products often contain orifices and cavities or other hollow parts that result from the manufacturing process and/or that are designed into the product for various purposes, such as weight reduction. Automotive vehicles, for example, include several such orifices and cavities throughout the vehicle, including those in the vehicle's structural pillars and in the sheet metal of the vehicle doors. It is often desirable to seal such orifices and cavities so as to minimize noise, vibrations, fumes, dirt, water, humidity, and the like from passing from one area to another within the vehicle by means of sealing members or baffle elements built into the orifice or cavity. Likewise, such members or elements often fulfil an additional task of reinforcing the hollow structure of the manufactured product, for example an automotive part, so much that it becomes more resistant to mechanical stress but still maintains the low weight advantage of the hollow structure.

Such elements used for sealing, baffling or reinforcing often consist of a carrier, made of plastic, metal, or another rigid material, and one or more layers of a thermoplastic material attached to it which is able to expand its volume when heat or another physical or chemical form of energy is applied, but they can also be entirely made of expandable material. Using an adequate design, it is possible to insert the baffle or reinforcement element into the hollow part of the structure during the manufacturing process but also to leave the inner walls of the structure still accessible (or the cavities passable) by for example a liquid. For example, during the manufacture process of a vehicle, the hollow parts of a metal frame can still be largely covered by an electro-coating ("e-coat") liquid while the baffle or reinforcement elements are already inserted, and afterwards during a heat treatment step, the expandable thermoplastic material of the baffle or reinforcement element expands to fill the cavities as intended.

The development of such baffles or reinforcement elements has led to highly advanced systems, where the expandable material is able to increase its volume by up to several hundred percent, forming a stable, cross-linked foam-like structure that fills the cavities and adhering to the walls of the structure intended to be sealed, baffled, or reinforced. Especially in automotive manufacturing, this has led to considerable weight reduction and excellent dampening of noise or vibrations in the car body.

Currently employed thermally expandable compositions often consist of polymers such as ethylene-vinyl acetate polymers that can be cross-linked by radical initiators, most commonly peroxides. In order to obtain foams, these compositions furthermore contain blowing agents, the most widely used being azodicarbonamide (also called azodicarboxamide or azobisformamide) and 4,4'-oxydibenzenesulfonyl hydrazide (abbreviated OBSH). Under activation conditions, such as elevated temperature, curing of the cross-linkable network takes place, while simultaneously the blowing agent decomposes and releases gases. This leads to the above mentioned volume expansion and the formation of a stable foam, which in ideal cases fills the cavity as intended and adheres to its walls. Such a system is for example disclosed in DE 10 2011 080 223 A1.

While these standard expandable compositions have been optimized sufficiently into highly advanced products, they still suffer from significant drawbacks inherent to their radical chemistry curing mechanisms. The peroxide initiators are activated at elevated temperatures and therefore limit the storage stability of compositions containing such compounds, as they decompose slowly over time even at ambient temperatures, a problem which becomes more severe in hot climates or under non-ideal storage conditions. Furthermore, due to their oxidizing nature, peroxides can cause oxidation side reactions in the composition itself and the surrounding substrate on which they are used, potentially leading to damages and deteriorations. Such reactions have to be inhibited or moderated by use of expensive antioxidants that cause a significant cost burden on the formulation of the expandable compositions.

Another problem in connection with the established solutions described above is the fact that the most commonly used exothermic blowing agents, in particular azodicarbonamide (ADCA), are increasingly facing regulatory problems regarding health and safety issues.

It is thus desirable to obtain a thermally expandable thermoplastic composition that overcomes the above discussed problems related to State-of-the-Art compositions.

SUMMARY OF THE INVENTION

The object of the present invention is to provide a storage-stable thermally expandable composition that is able to expand uniformly and to cure to form a stable foam structure over a wide range of temperatures, for example, in the range of 120 and 200° C. Furthermore, the produced foam should exhibit decreased water uptake and good adhesion to metallic, even oily, surfaces and other substrates commonly used in manufactured articles, in particular automotive vehicles.

Another object of the present invention is to provide a thermally expandable composition without the use of exothermic blowing agents, in particular azodicarbonamide (ADCA).

Still another object of the present invention is to provide a thermally expandable and cross-linkable composition without the use of free-radical initiators, in particular organic peroxides.

The subject of the present invention is a thermally expandable composition as defined in claim 1.

It was surprisingly found out that by using specific types of curatives the volume expansion rates and water absorption properties of a thermally expandable composition comprising at least one epoxy-functional polymer can be simultaneously improved.

One of the advantages of the thermally expandable composition of the present invention is that good expansion rates can be achieved over a wide range of temperatures without the use of exothermic blowing agents, in particular without use of azodicarbonamide.

Another advantage of the thermally expandable composition is that since the cross-linking of the composition is based on another type of curing chemistry than free-radical curing chemistry, the composition can be provided fee of free-radical initiators, in particular free of organic peroxides. Consequently, the composition also exhibits improved storage stability.

Other subjects of the present invention are presented in other independent claims. Preferred aspects of the invention are presented in the dependent claims.

DETAILED DESCRIPTION OF THE INVENTION

The subject of the present invention is a thermally expandable composition comprising:
- a) A polymer component P comprising:
  - a1) At least one epoxy-functional polymer EP,
  - a2) Optionally at least one acid anhydride-functional polymer AP, and
  - a3) Optionally at least one thermoplastic polymer TP,
- b) At least one endothermic chemical blowing agent BA, and
- c) At least one curative C selected from the group consisting of a urea, urea derivatives, guanidine derivatives, amidine derivatives, and imidazoles.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" refers to a collective of chemically uniform macromolecules produced by a polyreaction (polymerization, polyaddition, polycondensation) where the macromolecules differ with respect to their degree of polymerization, molecular weight and chain length. The term also comprises derivatives of said collective of macromolecules resulting from polyreactions, that is, compounds which are obtained by reactions such as, for example, additions or substitutions, of functional groups in predetermined macromolecules and which may be chemically uniform or chemically non-uniform.

The term "molecular weight" refers to the molar mass (g/mol) of a molecule or a part of a molecule, also referred to as "moiety". The term "average molecular weight" refers to number average molecular weight ($M_n$) of an oligomeric or polymeric mixture of molecules or moieties. The molecular weight may be determined by conventional methods, preferably by gel permeation-chromatography (GPC) using polystyrene as standard, styrene-divinylbenzene gel with porosity of 100 Angstrom, 1000 Angstrom and 10000 Angstrom as the column and tetrahydrofurane as a solvent, at 35° C.

The term "melting temperature" refers to a temperature at which a material undergoes transition from the solid to the liquid state. The melting temperature ($T_m$) is preferably determined by differential scanning calorimetry (DSC) according to ISO 11357-3 standard using a heating rate of 2° C./min. The measurements can be performed with a Mettler Toledo DSC 3+ device and the $T_m$ values can be determined from the measured DSC-curve with the help of the DSC-software. In case the measured DSC-curve shows several peak temperatures, the first peak temperature coming from the lower temperature side in the thermogram is taken as the melting temperature ($T_m$).

The "amount or content of at least one component X" in a composition, for example "the amount of the at least one thermoplastic polymer P" refers to the sum of the individual amounts of all thermoplastic polymers P contained in the composition. For example, in case the at least one thermoplastic polymer P comprises 20 wt.-% of the total weight of the composition, the sum of the amounts of all thermoplastic polymers P contained in the composition equals 20 wt.-%.

The term "room temperature" designates a temperature of 23° C.

Preferably, the polymer component P comprises at least 35 wt.-%, more preferably at least 45 wt.-%, even more preferably at least 55 wt.-%, still more preferably at least 60 wt.-%, in particular at least 65 wt.-%, such as at least 70 wt.-%, of the total weight of the thermally expandable composition.

According to one or more embodiments, the polymer component P comprises 35-95 wt.-%, preferably 45-90 wt.-%, more preferably 50-90 wt.-%, even more preferably 55-85 wt.-%, still more preferably 60-85 wt.-%, most preferably 65-85 wt.-%, of the total weight of the thermally expandable composition.

According to one or more embodiments, the thermally expandable composition is essentially free of organic peroxides, preferably essentially free of peroxides.

The expression "essentially free of peroxides" is understood to mean that the thermally expandable composition may contain only traces of peroxides, such as less than 0.25 wt.-%, preferably less than 0.1 wt.-%, more preferably less than 0.01 wt.-%, based on the total weight of the thermally expandable composition.

According to one or more further embodiments, the thermally expandable composition is essentially free of free-radical cross-linkers. The expression "essentially free of free-radical cross-linkers" is understood to mean that the amount of such substances, which are able to cross-link polymers by free-radical curing mechanism is preferably less than 0.25 wt.-%, more preferably less than 0.1 wt.-%, even more preferably less than 0.05 wt.-%, based on the total weight of the thermally expandable composition.

The thermally expandable composition comprises at least one endothermic chemical blowing agent BA. Chemical blowing agents are organic or inorganic compounds that decompose under influence of, for example temperature or humidity, while at least one of the formed decomposition products is a gas.

Despite the fact that exothermic blowing agents have been widely used in thermally expandable compositions, especially in automotive industry, they are not preferred for use in the thermally expandable composition of the present invention. Exothermic blowing agents are not preferred since they have been found to have potential to trigger respiratory sensitivity, are generally not safe from a toxicological point of view or have a risk of explosion. Furthermore, by-products such as ammonia, formamide, formaldehyde or nitrosamines are released during decomposition of exothermic blowing agents and these substances have been classified as hazardous substances and their use is prohibited in the construction of automobiles.

According to one or more embodiments, the thermally expandable composition is essentially free of ADCA (azodicarbonamide) and OBSH (4,4'-oxybis(benzenesulfonic acid hydrazide)), preferably essentially free of exothermic blowing agents, in particular ADCA, OBSH, DNPT (dinitroso pentamethylene tetramine), PTSS (p-toluenesulfonyl semicarbazide), BSH (benzene-4-sulfonyl hydrazide), TSH (4-toluenesulfonyl hydrazide), and 5-PT (5-phenyltetrazole). The expression "essentially free of" is understood to mean that the thermally expandable composition may contain only traces of the above listed compounds, such as less than 0.25 wt.-%, preferably less than 0.1 wt.-%, more preferably less than 0.01 wt.-%, based on the total weight of the thermally expandable composition.

Endothermic chemical blowing agents have the advantage that they are not hazardous or explosive, and that fewer volatile organic compounds (VOCs) are created during their decomposition. The decomposition products are essentially carbon dioxide and water.

According to one or more embodiments, the at least one endothermic chemical blowing agent BA comprises at least one organic acid. Suitable organic acids include, for example, monocarboxylic acids, such as acetic acid and propionic acid, as well as solid polycarboxylic acids, for example solid, hydroxy-functionalized or unsaturated dicarboxylic, tricarboxylic, tetracarboxylic or polycarboxylic acids, such as citric acid, tartaric acid, malic acid, fumaric acid, and maleic acid.

According to one or more embodiments, the at least one blowing agent BA comprises at least 85 wt.-%, preferably at least 90 wt.-%, more preferably at least 95 wt.-%, even more preferably at least 97.5 wt.-%, still more preferably at least 99 wt.-%, based on the total weight of the at least one blowing agent BA of the at least one organic acid.

According to one or more embodiments, the at least one organic acid is a multifunctional organic acid having at least two acidic functional groups, preferably at least two carboxylic groups. Partially esterified multifunctional organic acids having at least one free acidic functional group, in particular at least one free carboxylic group, are also suitable. According to one or more embodiments, the at least one organic acid has a molecular weight of not more than 1000 g/mol, preferably not more than 750 g/mol, more preferably not more than 500 g/mol.

According to one or more embodiments, the at least one organic acid is selected from the group consisting of citric acid, tartaric acid, malic acid, fumaric acid, and maleic acid, preferably citric acid.

Although some of the compounds used in the present invention are characterized as useful for specific functions, it should be understood that the use of these compounds is not limited to their typical functions. For example, it is also possible that the at least one organic acid, once heated to an elevated temperature, is also capable of acting as a hardener for polymers having functional groups, such as for the at least one epoxy-functional polymer EP.

The at least one organic acid may be present in the thermally expandable composition in free acid form, i.e. with protonated acidic functional groups, or as a salt with deprotonated acidic functional groups, for example as a carboxylate salt or as a mixture of these. Suitable cations for the carboxylate salts include, for example, $Li^+$, $Na^+$, $K^+$, $NH_4^+$, $Ca_2^+$, $Mg_2^+$, and the like.

According to one or more embodiments, the at least one organic acid is present in the thermally expandable composition in free acid form.

According to one or more embodiments, the at least one endothermic chemical blowing agent BA has a maximum decomposition peak temperature measured by Differential Scanning calorimetry (DSC) in the range of 135-200° C., preferably 150-200° C., more preferably 155-200° C., even more preferably 160-200° C. Preferably, the maximum decomposition peak measured by DSC is determined by a DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min.

According to one or more embodiments, the at least one endothermic chemical blowing agent BA comprises 1-35 wt.-%, preferably 5-25 wt.-%, more preferably 10-25 wt.-%, even more preferably 12.5-20 wt.-%, of the total weight of the thermally expandable composition.

According to one or more embodiments, the at least one organic acid comprises 1-35 wt.-%, preferably 5-25 wt.-%, more preferably 10-25 wt.-%, even more preferably 12.5-20 wt.-%, of the total weight of the thermally expandable composition.

It is possible that the at least one endothermic chemical blowing agent BA contains one or more activators that are used to lower the decomposition temperature of the at least one organic acid. Commonly used activators for organic acids include hydrogen carbonate (bicarbonate) and carbonate salts, in particular those of formula $XHCO_3$ or $X_2CO_3$, wherein X stands for a generic cation, such as $Na^+$, $K^+$, $NH_4^+$, ½ $Zn^{2+}$, ½ $Mg^{2+}$, and ½ $Ca^{2+}$, in particular $Na^+$ and $K^+$. These types of activators have, however, the disadvantage that they tend to remain in the produced foam and that they are water-soluble and thus increase the water absorption of the foam. Increased water absorption is especially undesirable in automotive sector, wherein the foamed compositions are used to achieve improved corrosion resistance and long-term durability.

According to one or more embodiments, the thermally expandable composition is substantially free of sodium and potassium bicarbonates, preferably substantially free of bicarbonates of formula $XHCO_3$, wherein X stands for a generic cation, in particular $Na^+$, $K^+$, $NH_4^+$, ½ $Zn^{2+}$, ½ $Mg^{2+}$, and ½ $Ca^{2+}$, more preferably substantially free of bicarbonates of formula $XHCO_3$ and carbonates of formula $X_2CO_3$, wherein X stands for a generic cation, in particular $Na^+$, $K^+$, $NH_4^+$, ½ $Zn^{2+}$, ½ $Mg^{2+}$, and ½ $Ca^{2+}$. The expression "substantially free of" is understood to mean that the thermally expandable composition may contain only traces of the above mentioned compounds, such as less than 0.5 wt.-%, preferably less than 0.25 wt.-%, more preferably less than 0.1 wt.-%, even more preferably less than 0.05 wt.-%, still more preferably less than 0.01 wt.-%, based on the total weight of the thermally expandable composition.

The thermally expandable composition further comprises at least one curative C selected from the group consisting of a urea, urea derivatives, guanidine derivatives, amidine derivatives, and imidazoles. The term "curative" refers in the present disclosure to compounds that promote cross-linking of polymers by catalytic action or participate directly in the cross-linking reaction and are thus incorporated into the formed polymeric network. It is, therefore, evident that the at least one curative C may be present in the thermally expandable composition as a hardener and/or a catalyst. It is furthermore possible that the at least one curative C is also used, for example, to decrease the decomposition temperature of the at least one organic acid. Consequently, the at least one curative C may be present in the thermally expandable composition as a hardener and/or catalyst and also as an activator and/or accelerator for the at least one endothermic chemical blowing agent BA.

Suitable urea derivatives to be used as the at least one curative C include, in particular, substituted urea of formula (I)

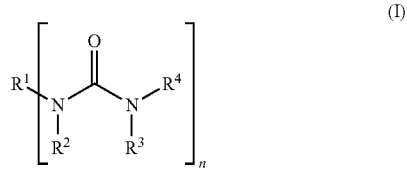

(I)

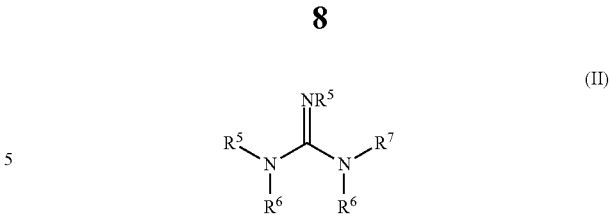

(II)

wherein $R^1$ and $R^2$ represent independently of each other hydrogen atoms or monovalent alkyl radicals with 1 to 10 carbon atoms which furthermore optionally comprise oxygen atoms, nitrogen atoms, and/or aromatic moieties or together form a divalent alkyl radical with 1 to 10 carbon atoms and which furthermore optionally comprises oxygen atoms, nitrogen atoms or aromatic moieties;

$R^3$ and $R^4$ represent independently of each other hydrogen atoms or monovalent alkyl radicals with 1 to 10 carbon atoms which furthermore optionally comprise oxygen atoms or nitrogen atoms; and index n has a value of 1 or 2.

Preferably, $R^1$ and $R^2$ independently represent hydrogen atoms or monovalent linear or branched alkyl radicals having 1 to 10, preferably 1 to 5, more preferably 1 to 4 carbon atoms, which optionally together represent a divalent alkyl radical forming a ring structure with the adjacent nitrogen atom and/or $R^3$ and $R^4$ independently represent hydrogen atoms or monovalent linear or branched alkyl radicals having 1 to 10, preferably 1 to 5, more preferably 1 to 4 carbon atoms, which optionally together represent a divalent alkyl radical forming a ring structure with the adjacent nitrogen atom.

Preferred substituted urea of formula (I) include those, where $R^1$ and $R^2$ in formula (I) both represent hydrogen atoms and/or where $R^3$ and $R^4$ both represent ethyl or methyl, preferably methyl groups. Further preferred urea derivatives of formula (I) include those where $R^1$, $R^2$, $R^3$, and $R^4$ in formula (I) all represent ethyl or methyl, preferably methyl groups, or where $R^1$, $R^2$, and $R^3$ represent ethyl or methyl, preferably methyl groups and $R^4$ represents a hydrogen atom, or where $R^1$ and $R^4$ both represent hydrogen atoms and $R^2$ and $R^3$ both represent ethyl or methyl, preferably methyl groups.

According to one or more embodiments, the thermally expandable composition comprises at least one curative C1 selected from the group consisting of urea and substituted urea of formula (I), preferably from the group consisting of urea, p-chlorophenyl-N,N-dimethylurea (monuron), 3-phenyl-1,1-dimethylurea (fenuron), 3,4-dichlorophenyl-N,N-dimethiyurea (diuron), N-methyl urea, N,N-dimethyl urea, N,N'-dimethyl urea, N,N,N'-trimethyl urea, N,N,N',N'-tetramethyl urea, and derivatives thereof where some or all methyl groups are ethyl groups instead.

Suitable urea derivatives are commercially available, for example, under the trade name of Dyhard® (from AlzChem Group AG), under the trade name of Omicure® (from CVC Thermoset Specialties), and under the trade name Amicure® (from Evonik).

Suitable guanidine derivatives to be used as the at least one curative C include, in particular, functional guanidine of formula (II)

wherein $R^5$ represents a hydrogen atom or a monovalent linear or branched alkyl radical having 1 to 10 carbon atoms which furthermore optionally comprises a nitrogen atom, a cycloaliphatic radical, or an aryl or aryl alkyl radical;

$R^6$ represents a hydrogen atom or a monovalent linear or branched alkyl radical having 1 to 10 carbon atoms; and $R^7$ represents a hydrogen atom or a monovalent linear or branched alkyl radical having 1 to 10 carbon atoms, or a cycloaliphatic radical which furthermore optionally comprises a nitrogen atom and/or an oxygen atom and/or silicon atom.

According to one or more embodiments, the thermally expandable composition comprises at least one curative C2 selected from the group consisting of functional guanidine of formula (II), preferably selected from the group consisting of cyanoguanidine, methyl guanidine, dimethyl guanidine, trimethyl guanidine, tetramethyl guanidine, acetylacetoneguanidine, 1,3-Di-o-tolylguanidine, 2-tert-Butyl-1,1,3,3-tetramethylguanidine, 1,2-Diisopropyl-3-phenylguanidine, 1,2-Bis(2,6-diisopropylphenyl)-3-hexylguanidine, more preferably cyanoguanidine.

Suitable guanidine derivatives are commercially available, for example, under the trade name of Dyhard® (from AlzChem Group AG).

Suitable amidine derivatives to be used as the at least one curative C include, in particular, functional amidines of formula (III)

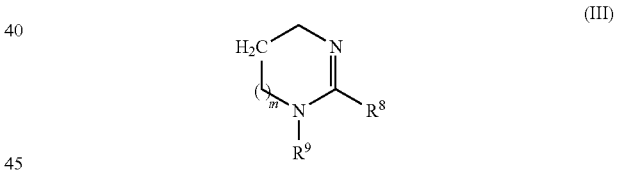

(III)

wherein $R^9$ represents a hydrogen atom or a monovalent linear or branched alkyl radical having 1 to 10 carbon atoms, or a cycloaliphatic radical, an aryl or arylalkyl radical, a hydroxyalkyl, a carboxyalkyl, or an amidoalkyl radical;

$R^9$ represents a hydrogen atom or a monovalent linear or branched alkyl radical having 1 to 10 carbon atoms, or a cycloaliphatic radical, or an aryl or arylalkyl radical, or a hydroxylalkyl or alkyl urethane radical: and index m has a value of 0, 1, or 2.

According to one or more embodiments, the thermally expandable composition comprises at least one curative C3 selected from the group consisting of functional amidines of formula (III), preferably selected from the group consisting of 1,8-Diazabicyclo[5.4.0]undec-7-ene (DBU), 1,5-Diazabicyclo[4.3.0]non-5-en (DBN), and 6-Dibutylamino-1,8-diazabicyclo[5.4.0]undec-7-ene.

Suitable functional amidines are commercially available, for example, under the trade name of Lupragen® (from BASF SE).

Suitable imidazoles to be used as the at least one curative C include, in particular, imidazoles of formula (IV)

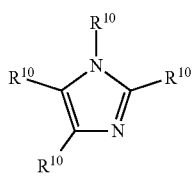

(IV)

wherein R¹⁰ represents a hydrogen atom or a monovalent linear or branched alkyl radical having 1 to 20 carbon atoms which furthermore optionally comprises a nitrogen atom or an oxygen atom, or a cycloaliphatic radical, an aryl or arylalkyl radical, or a hydroxyalkyl radical.

According to one or more embodiments, the thermally expandable composition comprises at least one curative C4 selected from the group consisting of imidazoles of formula (IV), preferably selected from the group consisting of 1-methyl-imidazole, 2-methyl-imidazole, 1,2-dimethyl-imidazole, 2-ethyl-imidazole, 2-Phenyl-4,5-dihydro-1H-imidazole, 2-ethyl-4-methyl-imidazole, 2-isopropyl imidazole, 2-heptadecyl imidazole, 1-cyanoethyl-2-ethyl-4-methylimidazole, 2-phenylimidazole, 1-benzyl-2-methylimidazole, 2-phenyl-4,5-dihydroxymethylimidazole, 2-phenyl-4-methylimidazole, and 1-cyanoethyl-2-phenylimidazole.

Suitable imidazoles are commercially available, for example, under the trade name of Curezol® (from Evonik Industries).

Preferably, the at least one curative C is selected from the group consisting of urea, urea derivatives, guanidine derivatives, amidine derivatives, and imidazoles, wherein the urea derivative is selected from the group consisting of the at least one curative C1, the guanidine derivative is selected from the group consisting of the at least one curative C2, the amidine derivative is selected from the group consisting of the at least one curative C3, and the imidazole is selected from the group consisting of the at least one curative C4.

Preferably, the at least one curative C is present in the thermally expandable composition in an amount of not more than 10 wt.-%, more preferably not more than 7.5 wt.-%, even more preferably not more than 5 wt.-%, based on the total weight of the thermally expandable composition. According to one or more embodiments, the at least one curative C comprises 0.01-10 wt.-%, preferably 0.05-7.5 wt.-%, more preferably 0.1-5 wt.-%, of the total weight of the thermally expandable composition.

According to one or more embodiments, the thermally expandable composition comprises the at least one curative C1 in an amount of 0.025-7.5 wt.-%, preferably 0.05-5 wt.-%, more preferably 0.075-5 wt.-%, even more preferably 0.1-5 wt.-%, still more preferably 0.15-5 wt. %, based on the total weight of the thermally expandable composition.

According to one or more embodiments, the thermally expandable composition comprises the at least one curative C2 in an amount of 0.025-7.5 wt.-%, preferably 0.05-5 wt.-%, more preferably 0.075-5 wt.-%, even more preferably 0.1-4.5 wt.-%, still more preferably 0.15-3.5 wt. %, based on the total weight of the thermally expandable composition.

According to one or more embodiments, the thermally expandable composition comprises the at least one curative C3, which comprises 0.025-7.5 wt.-%, preferably 0.05-5 wt.-%, more preferably 0.075-4.5 wt.-%, even more preferably 0.1-3.5 wt.-%, still more preferably 0.15-2.5 wt. %, based on the total weight of the thermally expandable composition.

According to one or more embodiments, the thermally expandable composition comprises the at least one curative C4 in an amount of 0.025-7.5 wt.-%, preferably 0.05-5 wt.-%, more preferably 0.075-4.5 wt.-%, even more preferably 0.1-3.5 wt.-%, still more preferably 0.15-2.5 wt. %, based on the total weight of the thermally expandable composition.

Epoxy Functional Polymer EP

The thermally expandable composition comprises at least one epoxy-functional polymer EP. Preferably, the at least one epoxy-functional polymer EP has an average of more than one epoxy group per molecule. Furthermore, the at least one epoxy-functional polymer EP may contain either polymerized or grafted epoxy functionality, i.e. the epoxide moieties may be present as part of a polymer backbone or grafted onto a polymer as a side chain.

Suitable epoxy-functional polymers to be used as the at least one epoxy-functional polymer EP include, for example, olefin glycidyl (meth)acrylate copolymers, olefin alkyl (meth)acrylate glycidyl (meth)acrylate terpolymers, glycidyl methacrylate grafted (co)polymers, epoxy resins, and epoxy-functionalized polyurethane polymers. The term "(meth)acrylate" designates in the present disclosure both acrylate and methacrylate.

Suitable olefin glycidyl (meth)acrylate copolymers to be used as the at least one epoxy-functional polymer EP include, for example, copolymers of ethylene, propylene, or butylene with glycidyl acrylate (GA) or with glycidyl (meth) acrylate (GMA).

According to one or more embodiments, the at least one epoxy-functional polymer EP comprises at least one olefin glycidyl (meth)acrylate copolymer EP1, preferably selected from the group consisting of ethylene glycidyl (meth)acrylate copolymers, propylene glycidyl (meth)acrylate copolymers, and butylene glycidyl (meth)acrylate copolymers, more preferably from the group consisting of ethylene glycidyl (meth)acrylate copolymers, in particular ethylene glycidyl methacrylate copolymers. Generally, the expression "the at least one component X comprises at least one component XN", such as "the at least one epoxy-functional polymer EP comprises at least one olefin glycidyl (meth) acrylate copolymer EP1" is understood to mean in the context of the present disclosure that the thermally expandable composition comprises one or more olefin glycidyl (meth)acrylate copolymers EP1 as representatives of the at least one epoxy-functional polymer EP.

According to one or more embodiments, the at least one olefin glycidyl (meth)acrylate copolymer EP1 has:
- a content of glycidyl methacrylate of 1-50 wt.-%, more preferably 2-25 wt.-% and/or
- a melt flow index, determined according to ISO 1133 (190° C./2.16 kg), of not more than 100 g/10 min, preferably not more than 75 g/10 min, more preferably not more than 50 g/10 min and/or
- a melting temperature ($T_m$) as determined by DSC measurements conducted according to ISO 11357-3 of at or below 150° C., preferably at or below 135° C., in particular in the range of 75-150° C., preferably 85-135° C., more preferably 90-125° C.

According to one or more embodiments, the at least one epoxy-functional polymer EP is composed of the at least one olefin glycidyl (meth)acrylate copolymer EP1, preferably selected from the group consisting of ethylene glycidyl (meth)acrylate copolymers, propylene glycidyl (meth)acrylate copolymers, and butylene glycidyl (meth)acrylate copolymers, more preferably from the group consisting of ethylene glycidyl (meth)acrylate copolymers, in particular ethylene glycidyl methacrylate copolymers. Generally, the expression "the at least one component X is composed of at least one component XN", such as "the at least one epoxy-functional polymer EP is composed of the at least one olefin glycidyl (meth)acrylate copolymer EP1" is understood to mean in the context of the present disclosure that the at least one epoxy-functional polymer EP is selected from the group consisting of the at least one olefin glycidyl (meth)acrylate copolymer EP1.

Suitable olefin alkyl (meth)acrylate glycidyl (meth)acrylate terpolymers to be used as the at least one epoxy-functional polymer EP include, for example, terpolymers, in particular random terpolymers, of ethylene and alkyl (meth) acrylate with glycidyl acrylate (GA) or with glycidyl methacrylate (GMA), wherein the alkyl group of the alkyl (meth)acrylate is preferably selected from the group consisting of methylene, ethylene, propylene, and butylene, in particular methylene or butylene.

Preferred olefin alkyl (meth)acrylate glycidyl (meth)acrylate terpolymers include ethylene methyl acrylate glycidyl acrylate terpolymers (E/MA/GA), ethylene ethyl acrylate glycidyl acrylate terpolymers (E/EA/GA), ethylene propyl acrylate glycidyl acrylate terpolymers (E/PA/GA), ethylene butyl acrylate glycidyl acrylate terpolymers (E/BA/GA), ethylene methyl methacrylate glycidyl acrylate terpolymers (E/MMA/GA), ethylene ethyl methacrylate glycidyl acrylate terpolymers (E/EMA/GA), ethylene propyl methacrylate glycidyl acrylate terpolymers (E/PMA/GA), ethylene butyl methacrylate glycidyl acrylate terpolymers (E/BMA/GA), ethylene methyl acrylate glycidyl methacrylate terpolymers (E/MA/GMA), ethylene ethyl acrylate glycidyl methacrylate terpolymers (E/EA/GMA), ethylene propyl acrylate glycidyl methacrylate terpolymers (E/PA/GMA), ethylene butyl acrylate glycidyl methacrylate terpolymers (E/BA/GMA), ethylene methyl methacrylate glycidyl methacrylate terpolymers (E/MMA/GMA), ethylene ethyl methacrylate glycidyl methacrylate terpolymers (E/EMA/GMA), ethylene propyl methacrylate glycidyl methacrylate terpolymers (E/PMA/GMA), ethylene butyl methacrylate glycidyl methacrylate terpolymers (E/BMA/GMA).

According to one or more embodiments, the at least one epoxy-functional polymer EP comprises at least one olefin alkyl acrylate glycidyl (meth)acrylate terpolymer EP2, preferably selected from the group consisting of random terpolymers of ethylene, alkyl (meth)acrylate, and glycidyl methacrylate, wherein the alkyl group of the alkyl (meth) acrylate is preferably selected from the group consisting of methylene, ethylene, propylene, and butylene, in particular methylene or butylene.

According to one or more embodiments, the at least one olefin alkyl acrylate glycidyl (meth)acrylate terpolymer EP2 has:
  a content of glycidyl methacrylate of 1-50 wt.-%, more preferably 2-25 wt.-% and/or
  a melt flow index, determined according to ISO 1133 (190° C./2.16 kg), of not more than 100 g/10 min, preferably not more than 75 g/10 min, more preferably not more than 50 g/10 min and/or
  a melting temperature ($T_m$) as determined by DSC measurements conducted according to ISO 11357-3 of at or below 150° C., preferably at or below 135° C., in particular in the range of 75-150° C., preferably 85-135° C., more preferably 90-125° C.

According to one or more embodiments, the at least one epoxy-functional polymer EP is composed of the at least one olefin alkyl acrylate glycidyl (meth)acrylate terpolymer EP2, preferably selected from the group consisting of random terpolymers of ethylene, alkyl (meth)acrylate, and glycidyl methacrylate, wherein the alkyl group of the alkyl (meth)acrylate is preferably selected from the group consisting of methylene, ethylene, propylene, and butylene, in particular methylene or butylene.

Suitable glycidyl (meth)acrylate grafted (co)polymers to be used as the at least one epoxy-functional polymer EP include, for example, glycidyl methacrylate grafted olefin vinyl acetate copolymers, glycidyl methacrylate grafted ethylene-α-olefin copolymers, glycidyl methacrylate grafted propylene-α-olefin copolymers, glycidyl methacrylate grafted polyethylene, glycidyl methacrylate grafted polypropylene, and glycidyl methacrylate grafted olefin copolymer elastomers, glycidyl (meth)acrylate grafted styrene butadiene copolymers, and glycidyl (meth)acrylate grafted styrene ethylene butylene styrene terpolymers.

According to one or more embodiments, the at least one epoxy-functional polymer EP comprises at least one glycidyl methacrylate grafted (co)polymer EP3, preferably selected from the group consisting of glycidyl methacrylate grafted olefin vinyl acetate copolymers, glycidyl methacrylate grafted ethylene-α-olefin copolymers, glycidyl methacrylate grafted propylene-α-olefin copolymers, glycidyl methacrylate grafted polyethylene, glycidyl methacrylate grafted polypropylene, glycidyl (meth)acrylate grafted styrene butadiene copolymers, and glycidyl (meth)acrylate grafted styrene ethylene butylene styrene terpolymers.

According to one or more embodiments, the at least one glycidyl methacrylate grafted (co)polymer EP3 has:
  a content of glycidyl methacrylate (GMA) of 0.1-10 wt.-%, preferably 0.1-5 wt.-%, more preferably 0.1-3.5 wt.-%, even more preferably 0.1-2.5 wt.-%, in particular 0.1-1.5 wt.-% and/or
  a melt flow index, determined according to ISO 1133 (190° C./2.16 kg), of not more than 100 g/10 min, preferably not more than 75 g/10 min, more preferably not more than 50 g/10 min and/or
  a melting temperature ($T_m$) as determined by DSC measurements conducted according to ISO 11357-3 of at or below 150° C., preferably at or below 135° C., in particular in the range of 75-150° C., preferably 85-135° C., more preferably 90-125° C.

According to one or more embodiments, the at least one epoxy-functional polymer EP is composed of the at least one glycidyl methacrylate grafted (co)polymer EP3, preferably selected from the group consisting of glycidyl methacrylate grafted olefin vinyl acetate copolymers, glycidyl methacrylate grafted ethylene-α-olefin copolymers, glycidyl methacrylate grafted propylene-α-olefin copolymers, glycidyl methacrylate grafted polyethylene, glycidyl methacrylate grafted polypropylene, glycidyl (meth)acrylate grafted styrene butadiene copolymers, and glycidyl (meth)acrylate grafted styrene ethylene butylene styrene terpolymers.

Suitable epoxy resins to be used as the at least one epoxy-functional polymer EP include solid and liquid epoxy resins having an average of more than one epoxy group per molecule and mixtures of these. The term "solid epoxy resin" designates epoxy resins having a glass transition temperature above the normal room temperature.

Suitable solid epoxy resins include those of the formula (V).

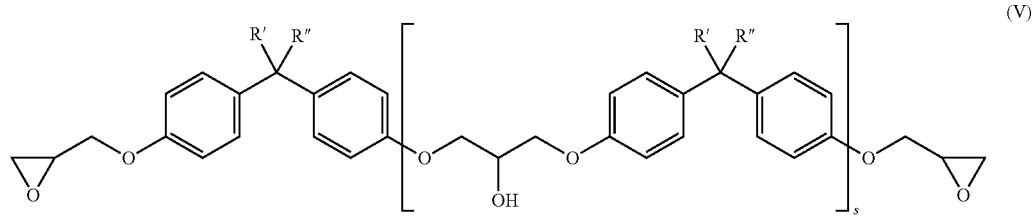

wherein the substituents R' and R" represent independently from one another either a hydrogen atom or a methyl group and the index s has a value of ≥1, preferably of ≥1.5, more preferably of 2 to 12.

Compounds of the formula (V) having an index s in the range from greater than 1 to 1.5 are known to a person skilled in the art as semisolid epoxy resins. For the purposes of the present disclosure, these are likewise considered to be solid epoxy resins.

Suitable solid epoxy resins are commercially available, for example, from Dow Chemical Company, from Huntsman International LLC, from Hexion Specialty Chemicals Inc., and from Olin Corporation.

Suitable liquid epoxy resins which, in particular, can be used together with solid epoxy resins of formula (V), include those of formula (VI)

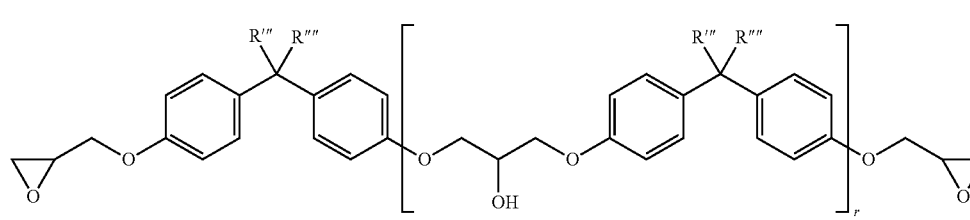

wherein the substituents R''' and R'''' represent independent from one another either a hydrogen atom or a methyl group and the index r has a value of 0 to 1, preferably a value of 0 to less than 0.2.

Preferred liquid epoxy resins are thus diglycidyl ethers of bisphenol A (DGEBA), of bisphenol F and of bisphenol A/F (the expression 'A/F' refers here to a mixture of acetone with formaldehyde which is used as a reactant in the preparation thereof).

Suitable liquid epoxy resins are commercially available, for example, under the trade names of Araldite® GY 250, Araldite® PY 304, and Araldite® GY 282 (from Huntsman International LLC), and under the trade names of D.E.R.® 331 or D.E.R.® 330 (from Dow Chemical Company), and under the trade names of Epikote® 828 or Epikote® 862 (from Hexion Specialty Chemicals Inc.).

Further suitable solid epoxy resins are so-called epoxy novolac resins. Preferred epoxy novolac resins include those of formula (VII)

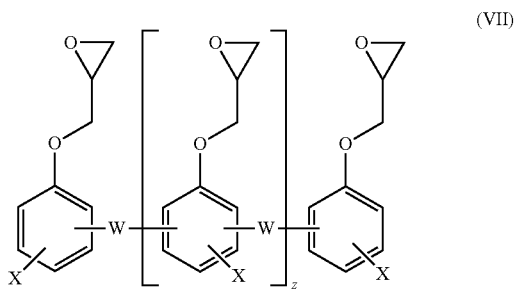

wherein X represents a hydrogen atom or a methyl group and W represents —$CH_2$— or a moiety of the formula (VIII)

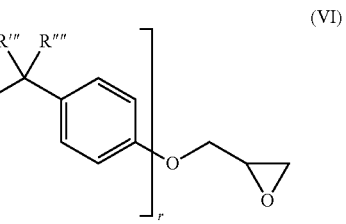

Preferably, index z has a value of 0 to 7, in particular a value of ≥3. In particular, these are phenol or cresol novolacs (W represents —$CH_2$—).

Such epoxy novolac resins are commercially available, for example, under the trade names of EPN®, ECN®, and Tactix® 556 (from Huntsman International LLC) and under the trade name of D.E.N® (from Dow Chemical Company).

According to one or more embodiments, the at least one epoxy-functional polymer EP comprises or is composed of at least one epoxy resin EP4, preferably selected from the group consisting of solid epoxy resin of formula (V), solid epoxy resin of formula (VII), and mixtures of solid epoxy resin of formula (V) and/or (VII) with liquid epoxy resin of formula (VI). The thermally expandable compositions according to these embodiments are particularly suitable for use as structural foams, in particular for use in reinforcing of hollow structures.

Further suitable epoxy resins to be used as the at least one epoxy-functional polymer EP include epoxy-functional polyurethane polymers of formula (IX)

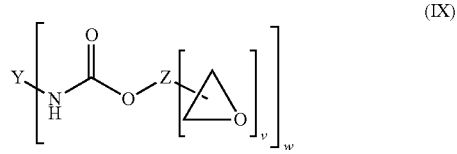

(IX)

wherein Y represents a w-valent radical of a linear or branched isocyanate-functional polyurethane polymer PU after the removal of the w terminal isocyanate groups:
  Z represents a (1+v)-valent radical of an aliphatic, cycloaliphatic, aromatic or aral aliphatic epoxide E containing a primary or secondary hydroxyl group after the removal of the hydroxyl group and v epoxide groups;
  v represents an integer having a value of 1, 2, or 3, preferably 2;
  and w represents an integer having a value from 2 to 4.

The linear or branched isocyanate-functional polyurethane polymer PU has preferably a structure according to formula (X)

(X)

wherein Y and w have the same meaning as described above.

The isocyanate-functional polyurethane polymer PU, represented in formula (X), may be obtained from the reaction of at least one polyisocyanate, preferably diisocyanate or triisocyanate, with at least one polyol, wherein the isocyanate groups are in stoichiometric excess over hydroxyl groups. The reaction can be carried out via known methods, preferably at temperatures of between 50 and 150° C., optionally in the presence of a catalyst.

Suitable polyols for the production of isocyanate-functional polyurethane polymer PU include, for example, polyoxyalkylene polyols, also referred to as polyether polyols, which are the polymerization product of ethylene oxide, 1,2-propylene oxide, 1,2- or 2,3-butylene oxide, tetrahydrofuran or mixtures thereof, optionally polymerized by means of a starter molecule with two or three active H atoms such as water or compounds with two or three OH groups, for example ethylene glycol or glycerol.

Preferred polyether polyols are polymerization products of ethylene oxide, 1,2-propylene oxide, 1,2- or 2,3-butylene oxide, tetrahydrofuran or mixtures thereof, particularly preferable being polypropylene oxides and polytetrahydrofurans. Suitable polytetrahydrofurans are commercially available, for example, from BASH under the trade names of PolyTHF®, for example PolyTHF®2000, PolyTHF®2500 CO, and PolyTHF®3000 CO. Suitable polypropylene oxides are commercially available, for example, from Shell under the trade name of Caradol®, such as Caradol®2000 and Caradol® ED56 and from Bayer under the trade name of Acclaim®, such as Acclaim® Polyol 2200, Acclaim® Polyol 12200, and Acclaim® Polyol 4200. Further suitable polyether polyols are commercially available from Dow Chemicals under the trade names of Voranol®1010L, Voranol® EP1900, and Voranol® CP4755. Especially preferred polyether polyol is polytetrahydrofuran. Preferred polyether polyols have, for example, a weight average molecular weight (Mw) in the range from 500 to 5000 g/mol, more preferably 1000 to 3000 g/mol and particularly preferably in the range from 1500 to 2500 g/mol.

The OH-functionality of the polyether polyols used is preferably in the range of approximately 2, for example, in the range from 1.9 to 2.1. Optionally, a compound with an OH functionality of 3, such as, for example, trimethylolpropane, butoxylated trimethylolpropane (for example, Simulsol® TOMB), and/or pentaerythritol can be added to the polyether polyol in order to increase the OH functionality.

Furthermore suitable polyols include hydroxyl-terminated rubbers. One or more OH-terminated rubbers can be used, wherein the use of two OH-terminated rubbers, in particular two OH-terminated polybutadienes, are preferred. Here, OH-terminated rubbers are understood to refer, for example and preferably, to hydroxyl-terminated polybutadienes and to castor oil-based polyols, wherein hydroxyl-terminated polybutadienes are particularly preferable. Polyols based on castor oil include castor oil of various grades and castor oil derivatives. Commercially available hydroxyl-terminated polybutadienes are commercially available, for example, from Cray valley under the trade names of Poly bd® and Krasol®, such as Krasol® LBH-P 2000 or Poly bd® R45V; from Evonik under the trade name of Polyvest® HT; from Emerald materials under the trade name of Hypro® 2800X95 HTB. Castor oil-based polyols are commercially available, for example, Alberdingk Boley under the trade name of Albodur®; from Baker Castor Oil Company under the trade name of Polycine®, such as Polycine®-GR80.

The OH-functionality of the hydroxyl-terminated rubbers is preferably in the range from 1.7 to 2.2 for anionically produced types or from 2.2 to 2.8 for types produced by free radical polymerization.

Also suitable as polyols are polyhydroxy-terminated acrylonitrile/butadiene copolymers, for example, the ones prepared using carboxyl-terminated acrylonitrile/butadiene copolymers, such as the ones, which are commercially available from Emerald Materials under the trade names of Hypro® CTBN, as well as the ones prepared using epoxides or amino alcohols.

Furthermore suitable polyols for the production of isocyanate-functional polyurethane polymer PU include polyester polyols prepared, for example, from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols, with organic dicarboxylic acids or their anhydrides or esters, such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid, or mixtures of the aforementioned acids, and also polyester polyols from lactones such as ε-caprolactone.

Suitable as polyols for the production of isocyanate-functional polyurethane polymer PU are furthermore polycarbonate polyols of the kind obtainable by reacting, for example, the abovementioned alcohols, i.e. those used to synthesize the polyester polyols, with dialkyl carbonates, diaryl carbonates or phosgene. Also suitable are polyols of the kind obtained by reduction of dimerized fatty acids.

The isocyanate-functional polyurethane polymer PU may be obtained by using only one type of polyol. Preferred polyols for these embodiments are polyether polyols, in particular polytetrahydrofuran. It may however be advantageous to use a mixture of different types of polyols for the production of the polyurethane polymer PU. According to one or more embodiments, the isocyanate-functional polyurethane polymer PU comprises is obtained by using a polyether polyol, in particular polytetrahydrofuran, and a polybutadiene polyol.

Suitable polyisocyanates for the production of the isocyanate-functional polyurethane polymer PU include diisocyanates and triisocyanates. Suitable diisocyanates are aliphatic, cycloaliphatic, aromatic or araliphatic diisocyanates, in particular those, m which are commercially available, such as methylene diphenyl diisocyanate (MDI), hexamethylene diisocyanate (HDI), toluene diisocyanate (TDI), toluidine diisocyanate (TODD, isophorone diisocyanate (IPDI), trimethyl hexamethylene diisocyanate (TMDI), 2,5- or 2,6-bis(isocyanatomethyl)-bicyclo[2.2.1]heptane, 1,5-naphthalene diisocyanate (NDI), dicyclohexyl methyl diisocyanate (H12MDI), p-phenylene diisocyanate (PPDI), m-tetramethyl xylylene diisocyanate (TMXDI), as well as their dimers, wherein HDI, IPDI, MDI, TDI are preferred. Particularly preferable diisocyanates are aliphatic and cycloaliphatic diisocyanates, for example, HDI, H12MDI and IPDI.

Suitable triisocyanates are trimers or biurets of aliphatic, cycloaliphatic, aromatic or araliphatic diisocyanates, in particular the isocyanurates and biurets of the diisocyanates described above.

The isocyanate-functional polyurethane polymer PU is then end-capped with at least one monohydroxyl epoxide compound E according to formula (XI)

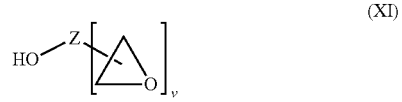

(XI)

wherein Z and v have the same meaning as described above.

The monohydroxyl epoxide compound E of formula (XI) is an aliphatic, cycloaliphatic, aromatic, or aral aliphatic epoxide containing one single primary or secondary hydroxyl group and from 1 to 3 epoxide groups.

The monohydroxyl epoxide compounds E of formula (XI) can be obtained, for example, by reacting polyols with epichlorohydrin. Depending on the reaction regime, the reaction of polyols with epichlorohydrin produces by-products including the corresponding monohydroxyl epoxide compounds in different concentrations. These can be isolated by routine separation operations.

Generally speaking, however, it is sufficient to use the product mixture obtained in the glycidylization reaction of polyols, comprising fully reacted polyol and polyol which has reacted partially to form the glycidyl ether. Examples of hydroxyl-containing epoxide compounds of this kind are butanediol monoglycidyl ether (contained in butanediol diglycidyl ether), hexanediol monoglycidyl ether (contained in hexanediol diglycidyl ether), cyclohexanedimethanol glycidyl ether, trimethylolpropane diglycidyl ether (contained as a mixture in trimethylolpropane triglycidyl ether), glycerol diglycidyl ether (contained as a mixture in glycerol triglycidyl ether), pentaerythritol triglycidyl ether (contained as a mixture in pentaerythritol tetraglycidyl ether). It is preferred to use trimethylolpropane diglycidyl ether, which occurs at a relatively high fraction in customarily prepared trimethylolpropane triglycidyl ether.

It is, however, also possible to use other, similar hydroxyl-containing epoxides, especially glycidol, 3-glycidyloxybenzyl alcohol or hydroxymethylcyclohexene oxide. Further preference is given to the liquid epoxy resins of formula (VI) as described above.

Preference for end-capping the isocyanate-functional polyurethane polymer PU extends to distillation residues which are obtained in the preparation of high-purity, distilled liquid epoxy resins. Distillation residues of this kind have a concentration of hydroxyl-containing epoxides which is up to three times higher than that of commercial undistilled liquid epoxy resins. Such resins are commercially available, for example under the trade name of Epilox® M850 from Leuna-Harze. Furthermore, it is also possible to use a wide variety of epoxides containing a β-hydroxy ether group, prepared by the reaction of (poly)epoxides with a substoichiometric amount of monofunctional nucleophiles such as carboxylic acids, phenols, thiols or secondary amines.

According to one or more embodiments, the at least one epoxy-functional polymer EP comprises or is composed of at least one epoxy-functional polyurethane polymer EP5, preferably at least one epoxy-functional polyurethane polymer of formula (IX).

According to one or more embodiments, the at least one epoxy-functional polymer EP comprises the at least one olefin glycidyl (meth)acrylate copolymer EP1 and/or the at least one olefin alkyl acrylate glycidyl (meth)acrylate terpolymer EP2 and/or the at least one glycidyl (meth)acrylate grafted (co)polymer EP3.

According to one or more preferred embodiments, the at least one epoxy-functional polymer EP is selected from the group consisting of olefin glycidyl (meth)acrylate copolymers, olefin alkyl (meth)acrylate glycidyl (meth)acrylate terpolymers, and glycidyl (meth)acrylate grafted (co)polymers, and epoxy-functionalized polyurethane polymers, preferably from the group consisting of the at least one olefin glycidyl (meth)acrylate copolymer EP1, the at least one olefin alkyl (meth)acrylate glycidyl (meth)acrylate terpolymer EP2, the at least one glycidyl (meth)acrylate grafted (co)polymer EP3, and the at least one epoxy-functionalized polyurethane polymer EP4, more preferably from the group consisting of the at least one olefin glycidyl (meth)acrylate copolymer EP1, the at least one olefin alkyl (meth)acrylate glycidyl (meth)acrylate terpolymer EP2, and the at least one glycidyl (meth)acrylate grafted (co)polymer EP3.

Acid Anhydride Functional Polymer AP

The polymer component P of the thermally expandable composition can further comprise at least one acid anhydride-functional polymer AP. Preferred acid anhydride-functional polymers AP have an average of more than one acid anhydride group per molecule. Furthermore, the at least one acid anhydride-functional polymer AP may contain either polymerized or grafted acid anhydride functionality, i.e. the acid anhydride moieties may be present as part of a polymer backbone or grafted onto a polymer as a side chain.

Suitable acid anhydride-functional polymers AP include maleic anhydride-functional polymers and tetrahydrophthalic anhydride-functional polymers, in particular maleic anhydride-functional polymers. Suitable maleic anhydride-functional polymers include, for example, olefin maleic anhydride copolymers, olefin alkyl (meth)acrylate maleic anhydride terpolymers, and maleic anhydride grafted (co)polymers.

Suitable olefin alkyl acrylate maleic anhydride terpolymers to be used as the at least one acid anhydride-functional polymer AP include, for example, terpolymers in particular random terpolymers of ethylene and alkyl (meth)acrylate, and maleic anhydride, wherein the alkyl group of the alkyl (meth)acrylate is preferably selected from the group consisting of methylene, ethylene, propylene, and butylene.

According to one or more embodiments, the at least one acid anhydride-functional polymer AP comprises at least one olefin alkyl acrylate maleic anhydride terpolymer AP1, preferably selected from the group consisting of random terpolymers of ethylene, alkyl (meth)acrylate, and maleic anhydride, wherein the alkyl group of the alkyl (meth)acrylate is preferably selected from the group consisting of methylene, ethylene propylene, and butylene, more preferably methylene, ethylene, and butylene.

According to one or more embodiments, the at least one olefin alkyl acrylate maleic anhydride terpolymer AP1 has:
 a content of maleic anhydride of 0.5-10 wt.-%, preferably 1-7.5 wt.-%, more preferably 1-5 wt.-% and/or
 a melt flow index, determined according to ISO 1133 (190° C./2.16 kg), of not more than 100 g/10 min, preferably not more than 75 g/10 min, more preferably not more than 50 g/10 min and/or
 a melting temperature ($T_m$) as determined by DSC measurements conducted according to ISO 11357-3 of at or below 150° C., preferably at or below 135° C., in particular in the range of 75-150° C., preferably 85-135° C., more preferably 90-125° C.

According to one or more embodiments, the at least one acid anhydride-functional polymer AP is composed of the at least one olefin alkyl acrylate maleic anhydride terpolymer AP1, preferably selected from the group consisting of random terpolymers of ethylene, alkyl (meth)acrylate, and maleic anhydride, wherein the alkyl group of the alkyl (meth)acrylate is preferably selected from the group consisting of methylene, ethylene propylene, and butylene, more preferably methylene, ethylene, and butylene.

Suitable olefin maleic anhydride copolymers to be used as the at least one acid anhydride-functional polymer AP include, for example, copolymers of maleic anhydride with ethylene, propylene, or butylene.

According to one or more embodiments, the at least one acid anhydride-functional polymer AP comprises or is composed of at least one olefin maleic anhydride copolymer AP2, preferably selected from the group consisting of copolymers of ethylene, propylene, and butylene with maleic hydride, more preferably ethylene maleic anhydride copolymers.

Suitable maleic anhydride grafted (co)polymers to be used as the at least one acid anhydride-functional polymer AP include, for example, maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, such as maleic anhydride grafted ethylene-propylene rubber (EPR).

According to one or more embodiments, the at least one acid anhydride-functional polymer AP comprises at least one maleic anhydride grafted (co)polymer AP3, preferably selected from the group consisting of maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, more preferably from the group consisting of maleic anhydride grafted olefin vinyl acetate copolymers, maleic anhydride grafted polyethylene, and maleic anhydride grafted polypropylene.

According to one or more embodiments, the at least one maleic anhydride grafted (co)polymer AP3 has:
 a content of maleic anhydride of 0.1-10 wt.-%, preferably 0.1-5 wt.-%, more preferably 0.1-3.5 wt.-%, even more preferably 0.1-2.5 wt.-%, in particular 0.1-1.5 wt.-% and/or
 a melt flow index, determined according to ISO 1133 (190° C./2.16 kg), of not more than 100 g/10 min, preferably not more than 75 g/10 min, more preferably not more than 50 g/10 min and/or
 a melting temperature ($T_m$) as determined by DSC measurements conducted according to ISO 11357-3 of at or below 150° C., preferably at or below 135° C., in particular in the range of 75-150° C., preferably 85-135° C., more preferably 90-125° C.

According to one or more embodiments, the at least one acid anhydride-functional polymer AP is composed of the at least one maleic anhydride grafted (co)polymer AP3, preferably selected from the group consisting of maleic anhydride grafted olefin alkyl (meth)acrylate copolymers, maleic anhydride grafted olefin vinyl acetate copolymers, maleic anhydride grafted ethylene-α-olefin copolymers, maleic anhydride grafted propylene-α-olefin copolymers, maleic anhydride grafted polyethylene, maleic anhydride grafted polypropylene, and maleic anhydride grafted olefin copolymer elastomers, more preferably from the group consisting of maleic anhydride grafted olefin vinyl acetate copolymers, maleic anhydride grafted polyethylene, and maleic anhydride grafted polypropylene.

According to one or more embodiments, the at least one acid anhydride-functional polymer AP comprises the at least one olefin alkyl acrylate maleic anhydride terpolymer AP1 and/or the at least one olefin maleic anhydride copolymer AP2 and/or the at least one maleic anhydride grafted (co)polymer AP3.

According to one or more preferred embodiments, the at least one acid anhydride-functional polymer AP is selected from the group consisting of olefin alkyl acrylate maleic anhydride terpolymers, olefin maleic anhydride copolymers, and maleic anhydride grafted (co)polymers, preferably from the group consisting of the at least one olefin alkyl acrylate maleic anhydride terpolymer AP1, the at least one olefin maleic anhydride copolymer AP2, and the at least one maleic anhydride grafted (co)polymer AP3, more preferably from the group consisting of the at least one olefin alkyl acrylate maleic anhydride terpolymer AP1 and the at least one olefin maleic anhydride copolymer AP2.

According to one or more embodiments, the polymer component P of the thermally expandable composition further comprises, in addition to the at least one epoxy-functional polymer EP, the at least one acid anhydride-functional polymer AP, wherein the ratio of the amount of the at least one epoxy-functional polymer EP to the amount of the at least one acid anhydride-functional polymer AP is preferably in the range of from 0.3:1 to 3:1, more preferably from 0.5:1 to 2:1 and wherein the at least one epoxy-functional polymer EP is preferably composed of the at least one olefin glycidyl (meth)acrylate copolymer EP1 and/or the at least one olefin alkyl acrylate glycidyl (meth)acrylate terpolymer EP2 and/or the at least one glycidyl (meth)acrylate grafted (co)polymer EP3, and wherein the at least one acid anhydride-functional polymer AP is preferably composed of the at least one olefin alkyl acrylate maleic anhydride terpolymer AP1 and/or the at least one olefin maleic anhydride copolymer AP2 and/or the at least one maleic anhydride grafted (co)polymer AP3.

Thermoplastic Polymer

The polymer component P of the thermally expandable composition can further comprise at least one thermoplastic polymer TP. Principally all thermoplastic polymers and thermoplastic elastomers (TPE) are suitable as the at least one thermoplastic polymer TP. It goes without saying that the at least one thermoplastic polymer TP is different from the at least one epoxy-functional polymer EP and from the at least one acid anhydride-functional polymer AP.

Suitable thermoplastic polymers to be used as the at least one thermoplastic polymer TP include, for example, styrene-butadiene copolymers, styrene-isoprene copolymers, ethylene-vinyl acetate copolymers (EVA), olefin (meth)acrylate copolymers, olefin alkyl (meth)acrylate copolymers, olefin (meth)acrylic acid copolymers, polyolefins, and halogenated polyolefins, such as polyvinyl chloride (PVC). Suitable olefin (meth)acrylate copolymers and olefin alkyl (meth)acrylate copolymers include, for example, ethylene-ethyl acrylate copolymers, ethylene-butyl acrylate copolymers, and ethylene-2-ethylhexyl acrylate copolymers.

Suitable thermoplastic polymers may contain unsaturated olefinic bonds and they can also contain functional groups other than epoxide groups or acid anhydride groups, such as halogen, nitrile, thiol, hydroxyl, or carboxyl groups. It is however preferred that the at least one thermoplastic polymer TP is free of functional groups, which may interfere with the curing mechanism of the thermally expandable composition. This approach offers a better controllability of the curing mechanism and secondary properties such as the adhesion properties.

According to one or more embodiments, the at least one thermoplastic polymer TP is a non-functionalized thermoplastic polymer, preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of ethylene-vinyl acetate copolymers, olefin (meth)acrylate copolymers and olefin alkyl (meth)acrylate copolymers, even more preferably from the group consisting of olefin (meth)acrylate copolymers and olefin alkyl (meth)acrylate copolymers.

According to one or more embodiments, the at least one thermoplastic polymer TP has:
  a melt flow index determined according to ISO 1133 (190° C./2.16 kg) of not more than 200 g/10 min, preferably not more than 175 g/10 min, even more preferably not more than 155 g/10 min and/or
  a melting temperature ($T_m$) as determined by DSC measurements conducted according to ISO 11357-3 of at or below 125° C., preferably at or below 110° C., more preferably at or below 100° C.

According to one or more embodiments, the at least one thermoplastic polymer TP comprises at least one first non-functionalized thermoplastic polymer TP1 and at least one second non-functionalized thermoplastic polymer TP2 different from the at least one first non-functionalized thermoplastic polymer TP1, wherein the at least one first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of ethylene-vinyl acetate copolymers, olefin (meth)acrylate copolymers and olefin alkyl (meth)acrylate copolymers, even more preferably from the group consisting of olefin (meth)acrylate copolymers and olefin alkyl (meth)acrylate copolymers.

According to one or more embodiments, the at least one first non-functionalized thermoplastic polymer TP1 has a melt flow index determined according to ISO 1133 (190° C./2.16 kg) of not more than 25 g/10 min, more preferably not more than 15 g/10 min, even more preferably not more than 10 min, in particular 1-10 g/10 min, preferably 1-7.5 g/10 min and/or the at least one second non-functionalized thermoplastic polymer TP2 has a melt flow index determined according to ISO 1133 (190° C./2.16 kg) of at least 15 g/10 min, more preferably at least 25 g/10 min, even more preferably at least 30 g/10 min, in particular 25-200 g/10 min, preferably 30-175 g/10 min.

According to one or more embodiments, the weight ratio of the total amount of the at least one first non-functionalized thermoplastic polymer TP1 and the at least one second non-functionalized thermoplastic polymer TP2 is in the range of from 5:1 to 1:3, preferably from 3:1 to 1:2, more preferably from 2.5:1 to 1:1.

According to one or more embodiments, the at least one thermoplastic polymer TP is composed of the at least one first non-functionalized thermoplastic polymer TP1 and the at least one second non-functionalized thermoplastic polymer TP2, wherein the at least one first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of ethylene-vinyl acetate copolymers, olefin (meth)acrylate copolymers and olefin alkyl (meth)acrylate copolymers, even more preferably from the group consisting of olefin (meth)acrylate copolymers and olefin alkyl (meth)acrylate copolymers.

According to one or more embodiments, the polymer component P of the thermally expandable composition further comprises, in addition to the at least one epoxy-functional polymer EP, the at least one thermoplastic polymer TP, wherein the at least one epoxy-functional polymer EP preferably comprises or is composed of the at least one olefin glycidyl (meth)acrylate copolymer EP1 and/or the at least one olefin alkyl acrylate glycidyl (meth)acrylate terpolymer EP2 and/or the at least one glycidyl (meth)acrylate grafted (co)polymer EP3 and wherein the at least one thermoplastic polymer TP preferably comprises or is composed of the at least one first non-functionalized thermoplastic polymer TP1 and the at least one second non-functionalized thermoplastic polymer TP2 different from the at least one first non-functionalized thermoplastic polymer TP1, wherein the at least one first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of ethylene-vinyl acetate copolymers, olefin (meth)acrylate copolymers and olefin alkyl (meth)acrylate copolymers.

According to one or more embodiments, the polymer component P of the thermally expandable composition comprises or is composed of the at least one epoxy-functional polymer EP and the at least one acid anhydride-functional polymer AP and the at least one thermoplastic polymer TP, wherein the at least one thermoplastic polymer TP preferably comprises at least 35 wt.-%, more preferably at least 45 wt.-%, even more preferably at least 55 wt.-%, of the total weight of the polymer component P and wherein at least one epoxy-functional polymer EP preferably comprises or is composed of the at least one olefin glycidyl (meth)acrylate copolymer EP1 and/or the at least one olefin alkyl acrylate glycidyl (meth)acrylate terpolymer EP2 and/or the at least one glycidyl (meth)acrylate grafted (co)polymer EP3 and wherein the at least one acid anhydride-functional polymer AP preferably comprises or is composed of the at least one olefin alkyl acrylate maleic anhydride terpolymer AP1 and/or the at least one olefin maleic anhydride copolymer AP2 and/or the at least one maleic anhydride grafted (co)polymer AP3 and wherein the at least one thermoplastic polymer TP preferably comprises or is composed of the at least one first non-functionalized thermoplastic polymer TP1 and the at least one second non-functionalized thermoplastic polymer TP2 different from the at least one first non-functionalized thermoplastic polymer TP1, wherein the at least one first and second non-functionalized thermoplastic polymers TP1 and TP2 are preferably selected from the group consisting of ethylene-vinyl acetate copolymers, olefin (meth)acrylate copolymers, olefin alkyl (meth)acrylate copolymers, and olefin (meth)acrylic acid copolymers, more preferably from the group consisting of ethylene-vinyl acetate copolymers, olefin (meth)acrylate copolymers and olefin alkyl (meth)acrylate copolymers.

According to one or more embodiments, the polymer component P of the thermally expandable composition is composed of the at least one epoxy-functional polymer EP, wherein the at least one epoxy-functional polymer EP preferably comprises or is composed of the at least one olefin glycidyl (meth)acrylate copolymer EP1 and/or the at least one olefin alkyl acrylate glycidyl (meth)acrylate terpolymer EP2 and/or the at least one glycidyl (meth)acrylate grafted (co)polymer EP3, more preferably of the at least one olefin glycidyl (meth)acrylate copolymer EP1 and/or the at least one olefin alkyl acrylate glycidyl (meth)acrylate terpolymer EP2.

According to one or more embodiments, the thermally expandable composition is substantially free of epoxy resins, in particular free of solid epoxy resins of formula (V), liquid epoxy resins of formula (VI), and solid epoxy resins of formula (VII). The expression "substantially free of" is understood to mean that the amount of the epoxy resins is in the thermally expandable composition is not more than 1.5 wt.-%, preferably not more than 1.0 wt.-%, more preferably not more than 0.5 wt.-%, even more preferably not more than 0.25 wt.-%, in particular not more than 0.1 wt.-%, based on the total weight of the thermally expandable composition. The thermally expandable compositions according to these embodiments are particularly suitable for use in sealing and baffling of hollow structures.

According to one or more embodiments, the thermally expandable composition comprises less than 3.5 wt.-%, preferably less than 2.5 wt.-%, more preferably less than 1.5 wt.-%, even more preferably less than 1.0 wt.-%, still more preferably less than 0.5 wt.-%, of rubber. The term "rubber" designates in the present disclosure natural, synthetic, or modified high molecular weight polymer or combination of polymers, which is capable of recovering from large deformations, i.e. has elastic properties. Typical rubbers are capable of being elongated or deformed to at least 200% of their original dimension under an externally applied force, and will substantially resume the original dimensions, sustaining only small permanent set (typically no more than about 20%), after the external force is released.

According to one or more further embodiments, the thermally expandable composition is substantially free of rubber. The expression "substantially free of" is understood to mean that the thermally expandable composition may contain only traces of rubbers, such as less than 0.25 wt.-%, preferably less than 0.1 wt.-%, more preferably less than 0.01 wt.-%, based on the total weight of the thermally expandable composition.

Apart from the essential and optional ingredients listed above, the thermally expandable composition may contain other compounds commonly used in such compositions and known to the ordinarily person skilled in the art. These include, for example, tackifying resins, fillers, colorants, dispersion aids or homogenizers, stabilizers, and the like.

The term "tackifying resin" designates in the present document resins that in general enhance the adhesion and/or tackiness of a composition. The term "tackiness" refers in the present document to the property of a substance of being sticky or adhesive by simple contact, which can be measured, for example, as a loop tack. Preferred tackifying resins are tackifying at a temperature of 25° C. Such tackifying resins lead to good adhesion on metal substrates, especially oiled metal substrates, both before and after foaming of the thermally expandable composition.

Suitable tackifying resins to be used in the thermally expandable composition have a relatively low average molecular weight ($M_n$), such as not more than 5'000 g/mol, in particular not more than 3'500 g/mol, preferably not more than 2'500 g/mol and a softening point, determined by a Ring and Ball method according to DIN EN 1238, of at or below 180° C., preferably at or below 160° C., more preferably at or below 150° C. Suitable tackifying resins include, in particular, synthetic resins, natural resins, and chemically modified natural resins.

The term "synthetic resin" designates in the present disclosure compounds obtained from the controlled chemical reactions such as polyaddition or polycondensation between well-defined reactants that do not themselves have the characteristic of resins. Monomers that may be polymerized to synthesize the synthetic resins may include aliphatic monomer, cycloaliphatic monomer, aromatic monomer, or mixtures thereof. Suitable aliphatic monomers may include $C_4$, $C_5$, and $C_6$ paraffins, olefins, and conjugated diolefins. Examples of aliphatic monomers or cycloaliphatic monomers include butadiene, isobutylene, 1,3-pentadiene, 1,4-pentadiene, cyclopentane, 1-pentene, 2-pentene, 2-methyl-1-pentene, 2-methyl-2-butene, 2-methyl-2-pentene, isoprene, cyclohexane, 1-3-hexadiene, 1-4-hexadiene, cyclopentadiene, and dicyclopentadiene. Examples of aromatic monomer include $C_8$, $C_9$, and $C_{10}$ aromatic monomers. Typical aromatic monomers include, styrene, alphamethyl styrene, vinyl toluene, methoxy styrene, tertiary butyl styrene, chlorostyrene, coumarone, and indene monomers including indene, and methyl indene, and combinations thereof.

Suitable synthetic resins include, for example, hydrocarbon resins, coumarone-indene resins, polyindene resins, polystyrene resins, vinyl toluene-alphamethyl styrene copolymer resins, and alphamethyl styrene resins.

The term "hydrocarbon resin" designates in the present disclosure synthetic resins made by polymerizing mixtures of unsaturated monomers obtained from petroleum based feedstocks, such as by-products of cracking of natural gas liquids, gas oil, or petroleum naphthas. These types of hydrocarbon resins are also known as "petroleum resins" or as "petroleum hydrocarbon resins". The hydrocarbon resins include also pure monomer aromatic resins, which are prepared by polymerizing aromatic monomer feedstocks that have been purified to eliminate color causing contaminants and to precisely control the composition of the product.

Suitable hydrocarbon resins are commercially available, for example, under the trade name of Wingtack®, Wingtack® Plus, Wingtack® Extra, and Wingtack® STS (all from Cray Valley); under the trade name of Escorez® 1000 series, Escorez® 2000 series, and Escorez® 5000 series (all from ExxonMobil Chemical); under the trade name of Novares® T series, Novares® TT series, Novares® TD series, Novares® TL series, Novares® TN series, Novares® TK series, and Novares® TV series (all from RUTGERS Novares GmbH); and under the trade name of Kristalex®, Plastolyn®, Piccotex®, Piccolastic® and Endex® (all from Eastman Chemicals).

Tackifying resins, if used, are preferably included in the thermally expandable composition in an amount of 2-20 wt.-%, preferably 4-15 wt.-%, more preferably 5-10 wt.-%, based on the total weight of the thermally expandable composition.

Suitable fillers to be used in the thermally expandable composition include, for example, ground or precipitated calcium carbonate, lime, calcium-magnesium carbonate, talcum, gypsum, graphite, barite, pyrogenic or precipitated silica, silicates, mica, wollastonite, kaolin, feldspar, chlorite, bentonite, montmorillonite, dolomite, quartz, cristobalite, calcium oxide, aluminum hydroxide, magnesium oxide, hollow ceramic spheres, hollow glass spheres, hollow organic spheres, glass spheres, functionalized alumoxanes, and carbon black. Suitable fillers include both organically coated and also uncoated commercially available forms of the fillers included in the above presented list. Particularly suitable fillers include ground or precipitated calcium carbonate, calcium-magnesium carbonate, talcum, gypsum, graphite, barite, pyrogenic or precipitated silica, silicates, mica, wollastonite, carbon black, and mixtures thereof.

Fillers, if used, are preferably incorporated in the thermally expandable compositions in an amount of 1-20 wt.-%, more preferably 1-15 wt.-%, even more preferably 2.5-15 wt.-%, based on the total weight of the thermally expandable composition.

Colorants or dyes, such as pigments, for example on the basis of carbon black, may also be included in the thermally expandable composition. Their amount is preferably between 0.1-1 wt.-%, based on the total weight of the thermally expandable composition.

Preferably, the thermally expandable composition after curing has a volume increase compared to the uncured composition of at least 150%, preferably at least 250%, more preferably at least 350%, whereby the volume increase is determined using the DIN EN ISO 1183 method of density measurement (Archimedes principle) in deionised water in combination with sample mass determined by a precision balance.

According to one or more embodiments, the thermally expandable composition after curing has a volume increase compared to the uncured composition in the range of 150-3000%, preferably 200-2500%, more preferably 250-2000%, even more preferably 300-1750%.

The thermally expandable compositions according to the present invention can be produced by mixing the constituents in any suitable mixing apparatus, for example in a dispersion mixer, planetary mixer, such as planetary roller, extruder such as a twin screw extruder, kneader, such as a Buss, Banbury, or roller kneader, or a two-roll mill.

It may be advantageous to heat the constituents before or during mixing, either by applying external heat sources or by friction generated by the mixing process itself, in order to facilitate processing of the components into a homogeneously mixed mixture by decreasing viscosities and/or melting of individual components. However, care has to be taken, for example by temperature monitoring and using cooling devices where appropriate, not to exceed the activation temperatures of the at least one endothermic chemical blowing agent BA. The thus obtained thermally expandable composition is preferably essentially solid at normal room temperature (23° C.), meaning that it does not visibly deform at this temperature just by means of gravity during a period of at least 24 h.

After mixing of the constituents of the thermally expandable composition, the thus obtained composition may be shaped into its desired form by, for example, extruding, blow-molding, pelleting, injection molding, compression molding, punching, or stamping or using any other suitable process.

The thermally expandable composition of the present invention may be produced in a substantially one-step process, involving the addition of all constituents in a series and/or simultaneously. However, it may also be advantageous to provide the thermally expandable composition as a two-part system, or even multipart system. In these cases, the constituents of the thermally expandable composition are provided in separate air- and moisture impermeable packages or compartments of a single package and they are mixed with each other and optionally with other compounds at the time of use or immediately before the time of use of the thermally expandable composition. Such an approach may, for example, be taken to increase shelf life of the thermally expandable composition in places with demanding conditions (such as extraordinarily high temperatures), to optimize storage room demand and transport weight, or to enable providing tailor-made, modular compositions for different applications.

The thermally expandable compositions according to the present invention are storage stable at normal storage conditions. The term "storage stable" refers in the present disclosure to materials, which can be stored at specified storage conditions for long periods of time, such as at least one month, in particular at least 3 months, without any significant changes in the application related properties of the material. The "typical storage conditions" refer here to temperatures of not more than 60° C., in particular not more than 50° C.

The expansion of the thermally expandable composition of the present invention is triggered by heating. This means that the thermally expandable composition is activated by a heating step that exceeds its activation temperature and exhibits a duration long enough for the decomposition of the at least one endothermic chemical blowing agent BA (resulting in gas formation) to proceed until the expandable material has expanded and cured into its intended final (sufficiently expanded and stable) state. The optimal temperature and duration of the heating step (dwell time) depends on the embodiment of the thermally expandable composition, in particular on the composition of the at least one endothermic chemical blowing agent BA and the at least one curative C contained in the thermally expandable composition. The thermally expandable composition may have an activation temperature in the range of 120-250° C., preferably 140-220° C., and a dwell time of the heating step in the range of 5-90 min, preferably 10-60 min.

The preferences given above for the at least one epoxy-functional polymer EP, the at least one acid anhydride functional polymer AP, the at least one thermoplastic polymer TP, the at least one endothermic chemical blowing agent BA, and the at least one curative C apply equally for all subjects of the present invention unless stated otherwise.

Another subject of the present invention is a baffle and/or a reinforcement element for hollow structures comprising or essentially consisting of the thermally expandable composition of the present invention.

Such elements are used to seal, baffle, and/or reinforce hollow structures, for example, a cavity in a hollow structural part of an automobile. Hollow parts in cars may include body components (for example panels), frame components (for example, hydroformed tubes), pillar structures (for example, A, B, C, or D-pillars), bumpers, roofs, or the like.

According to one or more embodiments, the baffle and/or reinforcement element for hollow structures essentially consists of the thermally expandable composition of the present invention. In these embodiments, it is advantageous to provide the element with such a shape that it can be easily fitted into and attached to the walls of the hollow structure to be baffled and/or reinforced. Such shaped elements can be provided from the thermally expandable composition, for example, by injection molding, punching or stamping, or extrusion through a shape template.

According to one or more further embodiments, the baffle and/or reinforcement element further comprises a carrier on which the thermally expansible composition is deposited or attached. Such a design may be more cost-efficient and it may facilitate fixation of the baffle and/or reinforcement element on the walls of the structure to be baffled and/or reinforced, for example by incorporation of pins, bolts, or hooks on the carrier element. Furthermore, with a suitable design of the carrier element, the mechanical performance and stability of the baffle and/or reinforcement element can be improved.

The carrier of the baffle and/or reinforcement element, if used, may consist of any material that can be processed into a shape. Preferred materials for the carrier include polymeric materials, such as a plastic, elastomers, thermoplastics, blends thereof, and the like. Preferred thermoplastic materials include, without limitation, polymers such as polyurethanes, polyamides, polyesters, polyolefins, polysulfones, polyethylene terephthalates (PET), polyvinylchlorides (PVC), chlorinated polyolefins, and the like. Especially preferred are high-temperature stable polymers such as poly(phenyl ethers), polysulfones, polyethersulfones, polyamides, in particular polyamide 6, polyamide 6,6, polyamide 11, polyamide 12, and mixtures thereof. Other suitable materials for the carrier include metals, especially aluminum or steel, or naturally grown, organic materials, such as wood or other (pressed) fibrous materials. Also glassy or ceramic materials can be used. It is also possible to use any combination of such materials. It is also contemplated that such materials can be filled, for example, with fibers, minerals, clays, silicates, carbonates, combinations thereof, or the like, or be foamed.

The carrier element can further exhibit any shape or geometry. It can also consist of several, not directly connected parts. For example, it can be massive, hollow, or foamed, or it can exhibit a grid-like structure. The surface of the carrier element can typically be smooth, rough, or structured, according to the intended use of the baffle and/or reinforcement element.

Another subject of the present invention is a process for manufacturing a baffle and/or reinforcement element of the present invention, wherein the thermally expandable composition is injection-molded onto a carrier or co-extruded with a carrier.

The details of the manufacturing process of a baffle and/or reinforcement element of the present invention depends largely on the material of the carrier. If the material of the carrier can be (injection-) molded or extruded, the baffle and/or reinforcement element can be produced in a two-step injection-molding process or by co-extruding the carrier and the thermally expandable composition.

In case of a two-step injection molding process, the first step comprises injecting the material of the carrier into a mold. After solidification, the cavity of the injection molding tool is enlarged or adjusted or the injection-molded piece is transferred into another tool followed by a second step comprising injecting of the thermally expandable composition.

In case the carrier cannot be shaped by injection-molding or extrusion, for example, because it is composed of a metal or an alloy, the carrier may be first manufactured by a suitable process and then introduced into an injection-molding tool. The thermally expandable composition may then be injection-molded into the tool where the carrier was previously placed. Another possibility is to extrude the thermally expandable composition onto a pre-fabricated carrier element. Of course there is also the possibility of manufacturing the carrier and an element of the thermally expandable composition individually by any suitable process, and then attaching the element of the thermally expandable composition to the carrier by any suitable means, such as chemically or physically, for example by gluing or the like, or mechanically, for example, by bolting, screwing, or the like.

Another subject of the present invention is the use of the baffle and/or reinforcement element of the present invention for sealing, baffling, or reinforcing of a cavity or a hollow structure of a land-, water-, or air-vehicle, preferably an automotive vehicle, and/or a cavity of a building such that the transmission of noise, vibrations, humidity, and/or heat is reduced, and/or the structure surrounding said cavity or hollow structure is mechanically strengthened.

Still another subject of the present invention is a method for sealing, baffling and/or reinforcing a cavity or a hollow structure, wherein an element comprising a thermally expandable composition according the present invention is introduced into said cavity or hollow structure and subsequently expanded by heat and/or by UV-treatment such that said cavity or hollow structure is at least partially filled by the expanded composition.

The temperature of the thermal expansion step is preferably 140-250° C., more preferably of 150-220° C., even more preferably 150-200° C. Preferred duration of the thermal expansion step, i.e. preferred baking time of the thermally expandable composition, is 5-90 min, more preferably 10-60 min, even more preferably 10-30 min.

Regarding the thermal activation of the element comprising the thermally expandable composition when used in manufacturing of automotive vehicles, it is advantageous to couple the thermal activation with another process step involving heat treatment. An example of such a process step is the electrocoating (cathodic dip painting/coating) of the chassis of a car body.

EXAMPLES

The followings chemicals shown in Table 1 were used in formulating the thermally expandable compositions.

TABLE 1

| | |
|---|---|
| Polymer TP1 | Random copolymer of ethylene and butyl acrylate, 25-35 wt.-% of butyl acrylate, Melt Index (190° C./2.16 kg) of 1-3.5 g/10 min (ISO 1133) |
| Polymer TP2 | Random copolymer of ethylene and butyl acrylate, 30-40 wt.-% of butyl acrylate, Melt Index (190° C./2.16 kg) of 35-45 g/10 min (ISO 1133) |
| Polymer EP1 | Copolymer of ethylene and glycidyl methacrylate, 5-10 wt.-% of glycidyl methacrylate, Melt Index (190° C./2.16 kg) of 0.5-4.5 g/10 min (ISO 1133) |
| Polymer EP2 | Random terpolymer of ethylene, acrylic ester, and glycidyl methacrylate, 6-12 wt.-% of glycidyl methacrylate, Melt Index (190° C./2.16 kg) of 5-10 g/10 min (ISO 1133) |
| Polymer AP | Random terpolymer of ethylene, acrylic ester, and maleic anhydride, 5-10 wt.-% of butyl acrylate, 1.5-5 wt.-% of maleic anhydride, Melt Index (190° C./2.16 kg) of 3.5-10 g/10 min (ISO 1133) |
| Filler | $CaCO_3$ |
| Blowing agent | Citric acid, 99 wt.-%, $d_{50}$ particle size 16-18 μm, maximum decomposition peak measured by DSC* 175-200° C. |
| Curative-1 | Urone derivative |
| Curative-2 | 2-ethylimidazole |
| Curative-3 | Dicyandiamide |
| Curative-4 | Diazabicyclo[5.4.0]undec-7-ene (DBU) |
| Curative-5 | Phenyl-Imidazoline |

*Determined by DSC822e differential scanning calorimeter from Mettler-Toledo by keeping the sample for 2 min at 25° C., then heating the sample from 25° C. to 280° C. at a rate of 5° C./min, then keeping the sample for 2 min at 280° C. and finally cooling the sample from 280° C. to 25° C. at a rate of 10° C./min Preparation of the Thermally Expandable Compositions All inventive and reference example compositions in this document were produced on standard production equipment suitable to compound thermoplastics with temperature control, i.e. twin screw extruder, Buss kneader or Banbury mixer. Polymers were mixed until homogeneous at a temperature 100-110° C. after which the system was cooled below activation of heat reactive raw materials (<90° C.). Heat reactive raw materials were then mixed into the system until homogeneous. The obtained material was subsequently hot-pressed into test samples that were used for volume expansion and water absorption testing procedures.

Volume Expansion

Expansion properties were tested for all samples by heat treating (baking) the individual samples at temperatures of 155 and 195° C. for 10 minutes in an oven. The heating ramp from room temperature (23° C.) to the respective baking temperature was 15 min (to 155° C.) or 20 min (to 195° C.). The temperatures and magnitude of expansion (in % based on the original volume prior to expansion) at the corresponding baking temperatures are shown in Tables 2-4.

Expansions were determined for each sample by measuring the density before and after expansion. The densities were determined according to DIN EN ISO 1183 using the water immersion method (Archimedes principle) in deionised water and a precision balance to measure the mass.

Water Absorption

The water absorption properties of the thermally expandable materials were tested using samples having the approximate dimensions 20 mm×20 mm×4 mm. The samples were prepared by following the procedure as described above and expanded and cured by heat-treatment at temperatures of 155 and 195° C. for 10 minutes. Thereafter, the heat-treated test samples were conditioned for 24 hours at normal room conditions (23° C., 50% relative humidity) and the initial weigh before water absorption was measured.

The conditioned test samples were kept for 24 hours in a container filled with water (water bath) having a water temperature of 23° C. The samples were kept immersed in water approximately 15 cm beneath the surface of the water. After the water storage, the test samples were removed from water bath, dried on the surface with an absorbent cloth, left to dry for 2 hours, after which the weight after water absorption was measured.

The water absorption values (wt.-%) were then calculated according to the following equation:

$$\text{Water absorption} = \frac{(m_i - m_0)}{m_0} \cdot 100\%$$

wherein $m_0$ is mass of the test sample prior to storage in water bath and $m_i$ is the mass of the test sample after a storage time i in water bath.

TABLE 2

| | Ref-1 | Ref-2 | Ex-1 | Ex-2 | Ex-3 | Ex-4 | Ex-5 | Ex-6 | Ex-7 | Ex-8 |
|---|---|---|---|---|---|---|---|---|---|---|
| Compositions [pbw] | | | | | | | | | | |
| Polymer TP1 | 35.95 | 40.83 | 35.95 | 35.95 | 35.95 | 35.95 | 35.95 | 35.95 | 35.85 | 35.85 |
| Polymer TP2 | 22.55 | 27.43 | 22.55 | 22.55 | 22.55 | 22.55 | 22.55 | 22.55 | 22.45 | 22.45 |
| Polymer EP1 | 9.75 | — | 9.75 | 9.75 | 9.75 | 9.75 | 9.75 | 9.75 | 9.75 | 9.75 |
| Polymer EP2 | — | — | — | — | — | — | — | — | — | — |
| Polymer AP | 9.75 | 9.75 | 9.75 | 9.75 | 9.75 | 9.75 | 9.75 | 9.75 | 9.75 | 9.75 |
| Filler | 7.00 | 7.00 | 7.00 | 7.00 | 7.00 | 7.00 | 7.00 | 7.00 | 7.00 | 7.00 |
| Blowing agent | 15.00 | 15.00 | 15.00 | 15.00 | 15.00 | 15.00 | 15.00 | 15.00 | 15.00 | 15.00 |
| Catalyst-1 | — | 0.50 | 0.12 | 0.25 | — | — | — | — | — | — |
| Catalyst-2 | — | — | — | — | 0.12 | 0.25 | — | — | — | — |
| Catalyst-3 | — | — | — | — | — | — | 0.12 | 0.25 | — | — |
| Catalyst-4 | — | — | — | — | — | — | — | — | 0.20 | — |
| Catalyst-5 | — | — | — | — | — | — | — | — | — | 0.20 |
| Total | 100.00 | 100.50 | 100.12 | 100.25 | 100.12 | 100.25 | 100.12 | 100.25 | 100.00 | 100.00 |
| Properties | | | | | | | | | | |
| Expansion @155° C., [%] | 335 | 638 | 497 | 589 | 511 | 464 | 507 | 553 | 378 | 447 |
| Expansion @195° C., [%] | 651 | 283 | 858 | 807 | 811 | 643 | 730 | 941 | 707 | 1089 |
| Water uptake @155° C., [wt.-%] | 8.5 | — | 4.7 | 4.3 | 4.3 | 3 | 5.1 | 5.5 | — | — |
| Water uptake @195° C., [wt.-%] | 10 | — | 5.5 | 4.8 | 7.8 | 3.6 | 8.5 | 5.2 | — | — |

TABLE 3

|  | Ex-9 | Ex-10 | Ex-11 | Ex-12 | Ex-13 | Ex-14 |
|---|---|---|---|---|---|---|
| Compositions [pbw] | | | | | | |
| Polymer TP1 | — | — | — | — | — | 10.00 |
| Polymer TP2 | — | — | — | — | — | — |
| Polymer EP1 | — | — | — | — | — | — |
| Polymer EP2 | 77.44 | 77.44 | 77.44 | 77.44 | 77.44 | 67.44 |
| Polymer AP | — | — | — | — | — | — |
| Filler | 7.00 | 7.00 | 7.00 | 7.00 | 7.00 | 7.00 |
| Blowing agent | 15.00 | 15.00 | 15.00 | 15.00 | 15.00 | 15.00 |
| Catalyst-1 | — | — | — | 2.00 | 5.00 | — |
| Catalyst-2 | — | — | — | — | — | — |
| Catalyst-3 | 0.50 | 1.00 | 2.00 | — | — | 2.00 |
| Catalyst-4 | — | — | — | — | — | — |
| Catalyst-5 | — | — | — | — | — | — |
| Total | 99.94 | 100.44 | 101.44 | 101.44 | 104.44 | 101.44 |
| Properties | | | | | | |
| Expansion @155° C., [%] | 539 | 523 | 510 | 513 | 423 | 496 |
| Expansion @195° C., [%] | 729 | 834 | 725 | 873 | 878 | 475 |
| Water uptake @155° C., [wt.-%] | — | — | — | — | — | — |
| Water uptake@195° C., [wt.-%] | — | — | — | — | — | — |

The invention claimed is:

1. A thermally expandable composition comprising:
   a) a polymer component P comprising:
      a1) at least one epoxy-functional polymer EP,
      a2) at least one acid anhydride-functional polymer AP, and
      a3) optionally at least one thermoplastic polymer TP,
   b) at least one endothermic chemical blowing agent BA, and
   c) at least one curative C selected from the group consisting of a urea, urea derivatives, guanidine derivatives, amidine derivatives, and imidazoles,
   wherein the thermally expandable composition, after curing, has a volume increase of at least 378% when heated at 155° C. for 10 minutes, and a volume increase of at least 643% when heated at 195° C. for 10 minutes.

2. The thermally expandable composition according to claim 1, wherein the polymer component P comprises at least 45 wt.-%, of the total weight of the thermally expandable composition and/or wherein the at least one endothermic chemical blowing agent BA comprises 1-35 wt.-%, of the total weight of the thermally expandable composition.

3. The thermally expandable composition according to claim 1, wherein the composition is essentially free of organic peroxides.

4. The thermally expandable composition according to claim 1, wherein the composition is essentially free of ADCA (azodicarbonamide) and OBSH (4,4'-oxybis(benzenesulfonic acid hydrazide)).

5. The thermally expandable composition according to claim 1, wherein the at least one endothermic chemical blowing agent BA comprises at least one organic acid, wherein the at least one organic acid is a multifunctional organic acid having at least two acidic functional groups.

6. The thermally expandable composition according to claim 5, wherein the at least one organic acid is present in the thermally expandable composition in free acid form.

7. The thermally expandable composition according to claim 1, wherein the composition essentially free of sodium and potassium bicarbonates.

8. The thermally expandable composition according to claim 1, wherein the at least one curative C comprises 0.01-10 wt.-%, of the total weight of the thermally expandable composition.

9. The thermally expandable composition according to claim 1, wherein the at least one epoxy-functional polymer EP comprises at least one olefin glycidyl (meth)acrylate copolymer EP1 and/or at least one olefin alkyl acrylate glycidyl (meth)acrylate terpolymer EP2 and/or at least one glycidyl (meth)acrylate grafted (co) polymer EP3 and/or wherein the at least one acid anhydride-functional polymer AP comprises at least one olefin alkyl acrylate maleic anhydride terpolymer AP1 and/or at least one olefin maleic anhydride copolymer AP2 and/or at least one maleic anhydride grafted (co) polymer AP3.

10. The thermally expandable composition according to claim 1, wherein the at least one thermoplastic polymer TP is a non-functionalized thermoplastic polymer.

11. The thermally expandable composition according to claim 1, wherein the at least one thermoplastic polymer TP comprises at least one first non-functionalized thermoplastic polymer TP1 and at least one second non-functionalized thermoplastic polymer TP2 different from the at least one first non-functionalized thermoplastic polymer TP1.

12. The thermally expandable composition according to claim 1, wherein the thermally expandable composition, after curing by heating at 155° C. for 10 minutes, has a water uptake of 3-5.5% by weight.

13. The thermally expandable composition according to claim 1, wherein the ratio of the amount of the at least one epoxy-functional polymer EP to the amount of the at least one acid anhydride-functional polymer AP is in the range of from 0.5:1 to 2:1.

14. A baffle and/or a reinforcement element for hollow structures comprising a thermally expandable composition according to claim 1.

15. The baffle and/or reinforcement element of claim 14 further comprising a carrier on which the thermally expandable composition is deposited or attached.

16. A process for manufacturing a baffle and/or a reinforcement element according to claim 13, wherein the thermally expandable composition is injection-molded onto the carrier or co-extruded with the carrier.

17. A method comprising applying the baffle and/or the reinforcement element according to claim 14 for sealing, baffling, or reinforcing of a cavity or a hollow structure of a land-, water-, or air-vehicle, and/or a cavity of a building such that the transmission of noise, vibrations, humidity, and/or heat is reduced, and/or the structure surrounding the cavity is mechanically strengthened.

18. A method for sealing, baffling and/or reinforcing a cavity or hollow structure, wherein an element comprising a thermally expandable composition according to claim 1 is introduced into the cavity or hollow structure and subsequently expanded by heat such that the cavity or hollow structure is at least partially filled by the expanded composition.

* * * * *